United States Patent [19]

Badders et al.

[11] Patent Number: 5,625,798

[45] Date of Patent: Apr. 29, 1997

[54] METHOD AND SYSTEM EXTRACTING ATTRIBUTE INFORMATION CORRESPONDING TO COMPONENTS INCLUDED IN A COMPUTER AIDED DESIGN SYSTEM DRAWING SUCH AS A PROCESS AND INSTRUMENTATION DIAGRAM

[75] Inventors: Richard A. Badders, Washington; O. Michael Maide, Pittsburgh, both of Pa.

[73] Assignee: KNC, Inc., Pittsburgh, Pa.

[21] Appl. No.: 201,510

[22] Filed: Feb. 24, 1994

[51] Int. Cl.⁶ .......................... G06F 9/455; G06F 17/50
[52] U.S. Cl. .......................... 395/500; 364/188; 395/326; 395/964
[58] Field of Search .................. 364/188, 497, 364/518; 395/500, 120, 155, 148, 145, 161

[56] References Cited

U.S. PATENT DOCUMENTS

| | | | |
|---|---|---|---|
| 4,862,345 | 8/1989 | Lekron | 364/188 |
| 4,885,697 | 12/1989 | Hubner | 364/497 |
| 4,912,657 | 3/1990 | Saxton et al. | 364/518 |
| 5,138,697 | 8/1992 | Yamamoto et al. | 395/120 |
| 5,165,015 | 11/1992 | Coggins | 395/155 |
| 5,185,857 | 2/1993 | Rozmanith et al. | 395/148 |
| 5,341,469 | 8/1994 | Rossberg et al. | 395/145 |
| 5,367,622 | 11/1994 | Coggins | 395/155 |
| 5,444,843 | 8/1995 | Nilsson et al. | 395/161 |

*Primary Examiner*—Kevin J. Teska
*Assistant Examiner*—Russell W. Frejd
*Attorney, Agent, or Firm*—Kenyon & Kenyon

[57] ABSTRACT

Information may be provided relating to each component in a computer aided design (CAD) drawing indicating certain attributes of each of the components. Standard CAD blocks are provided which include attributes attached to the blocks which directly correspond to possible components to be used in the CAD drawing. Information relating to each component added in the CAD drawing is entered into an attribute block of a database file corresponding to the type of component added in the CAD drawing. When the drawing is completed, database output files are generated and the attribute data may be provided to a user via an output device such as a printer printing a hard copy or a display device displaying the information.

18 Claims, 7 Drawing Sheets

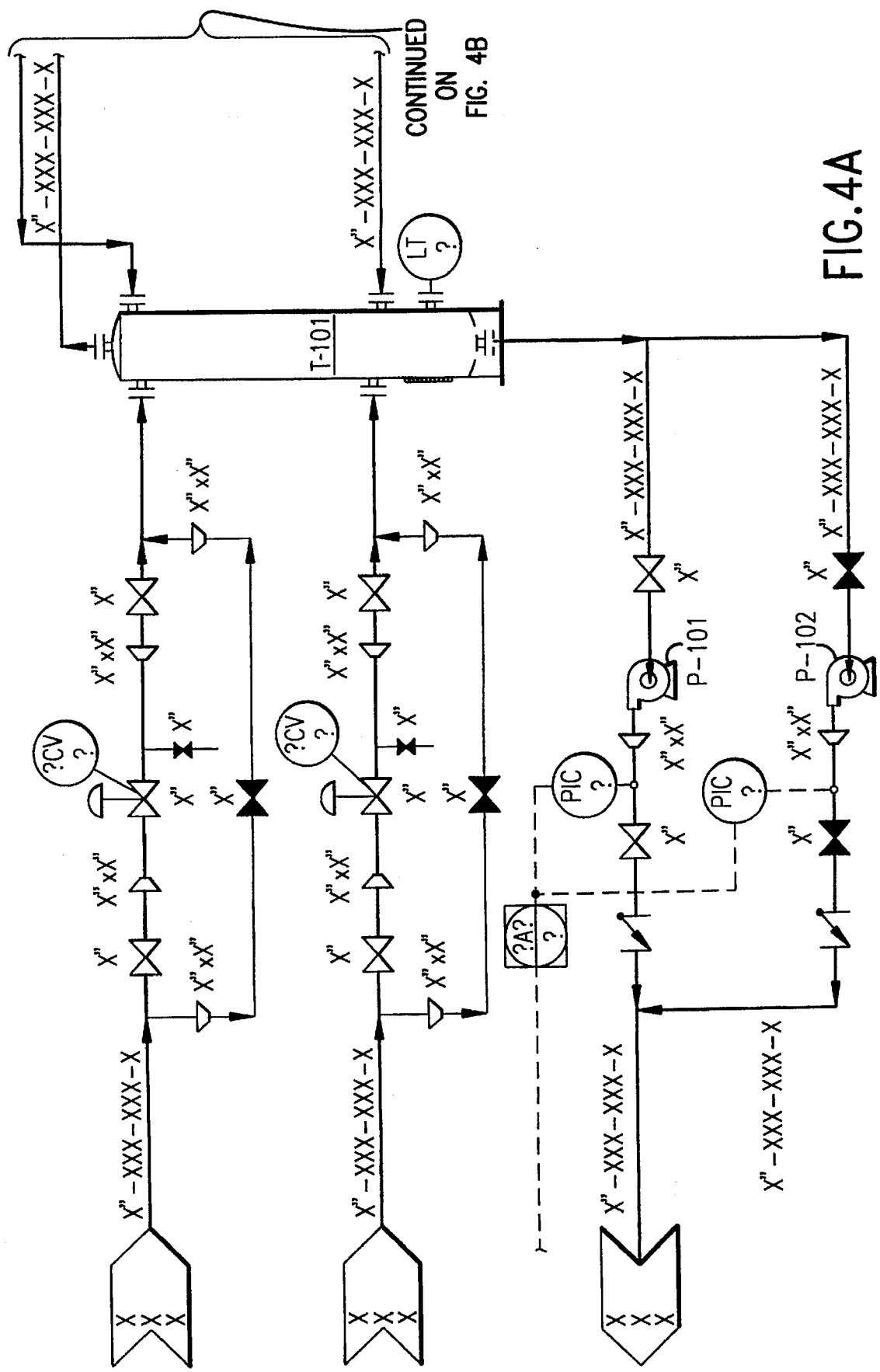

TEST DATABASE OUTPUT FILE
VESSELS

| VESSEL NUMBER | VESSEL DIAMETER | NOMINAL VOLUME | FLUID/SOLID | OPER. TEMP. | OPER. PRESS. | MAT'L CONST. |
|---|---|---|---|---|---|---|
| 3320 03 0133 | 20'-0" DIA.x 22'-3" LG. | 52292 GAL | FLUID | 100 C | 50 PSI | SS-312 |
| 3320 06 0001 | 10'-0" DIA.x 17'-0" LG. | 9996 GAL | SOLID | 23 C | 0 PSI | CS |
| 3320 06 0002 | 20'-0" DIA.x 22'-3" LG. | 52292 GAL | SOLID | 50 C | 1 PSI | SS-316 |
| 3320 06 0003 | 20'-0" DIA.x 22'-3" LG. | 52292 GAL | FLUID | 250 C | 150 PSI | SS-316 |
| 3320 06 0008 | 10'-0" DIA.x 17'-0" H. | 9996 GAL | FLUID | 23 C | 3 PSI | CS |
| 3320 06 0009 | 25'-0" DIA.x 27'-6" LG. | 100980 GAL | FLUID | 300 C | 200 PSI | CS |

FIG.5A

| | | | | | |
|---|---|---|---|---|---|
| 3320 06 0011 | 5'-4" DIA. x 11'-11" LG. | 2030 GAL | FLUID | -10 C | 0 PSI | SS-316 |
| 3320 06 0013 | 14'-0" DIA. x 13'-0" H. | 35,000 GAL | FLUID | 100 C | 5 PSI | SS-316 |
| 3320 06 0014 | 14'-0" DIA. x 31'-0" LG. | 35000 GAL | FLUID | 70 C | 10 PSI | CS |
| 3320 06 0015 | 14'-0" DIA. x 31'-0" LG. | 35000 GAL | FLUID | 200 C | 150 PSI | SS-316 |
| 3320 06 0110 | 5'-4" DIA. x 11'-11" LG. | 2030 GAL | FLUID | 50 C | 20 PSI | SS-316 |
| 3320 06 0124 | 5'-4" DIA. x 11'-11" LG. | 2030 GAL | FLUID | 270 C | 100 PSI | SS-316 |

FIG. 5B

METHOD AND SYSTEM EXTRACTING ATTRIBUTE INFORMATION CORRESPONDING TO COMPONENTS INCLUDED IN A COMPUTER AIDED DESIGN SYSTEM DRAWING SUCH AS A PROCESS AND INSTRUMENTATION DIAGRAM

BACKGROUND OF THE INVENTION

The present invention relates to a system and method of extracting and providing attribute information corresponding to components such as equipment, instruments and process lines included in a computer aided design system drawing.

Computer aided design (CAD) systems such as AutoCAD® and Intergraph® have been used in creating drawings such as a Process & Instrumentation Diagram (P&ID) used in, for example, a process involved in a plant operation. However, if a drawing such as a P&ID is designed by one company and provided to a second company for operation in the second company's plant, some computer aided design systems such as AutoCAD® do not provide a design of the system including a listing of attributes corresponding to each individual piece of equipment, instrument or process line in the system. Therefore, if such a system is designed by a first company and provided to a second company for operation in their plant, for example, the second company cannot easily obtain detailed information about each individual piece of equipment from a view of the AutoCAD® design system drawing. Therefore, a need has arisen to provide information via attributes and known database software relative to a computer aided design drawing for each individual piece of equipment, instrument or process line in the computer aided design drawing.

SUMMARY OF THE INVENTION

The present invention relates to a system and a method of extracting information relating to each component such as each piece of equipment, instrument or process line in a computer aided design drawing which may be provided as a report in a format such as a printed hard copy, data stored on a disk or some type of memory device or displayed on a display device. This enables a company, for example, to purchase each individual piece of the entire system on the computer aided design drawing merely by obtaining the individual extracted information for each individual piece of equipment or instrument in the entire system. Additionally, the hard copy or displayed reports which may be provided by the system and method of the present invention allow for a company having a system providing a particular plant process to specifically show an outside party (e.g., an OSHA regulator) how the particular process works by operating the CAD software in conjunction with the database software relating to the individual components in the drawing such as pieces of equipment, instruments or process lines to show exactly what is contributing to the plant process.

Specifically, the method and system according to the present invention initially creates several standard database files (e.g., in a dBase® 3+ format). The database directory include files corresponding to components including equipment and instruments such as vessels, pumps, temperature elements, pressure indicators, blowers, exchangers, agitators, nozzles, valves, actuators, process lines and/or any other items which are typically included in the creation of a computer aided design drawing such as a P&ID. A standard format of attribute tags or information items is used in each database including items pertinent to the particular equipment, instrument or process line being identified in that database. Standard computer aided design blocks (e.g., AutoCAD® blocks) are previously set up according to an embodiment of the present invention which have attached attributes which directly correspond to each attribute tag or item in each particular database.

Each of the database files is initially created without any information being stored therein. Information relating to each piece of equipment, instrument or process line is then entered graphically in the AutoCAD® system. As discussed above, standard AutoCAD® blocks are provided by the method of the present invention which include attributes attached to the blocks which directly correspond to each item in each particular equipment, instrument or process line database. When a piece of equipment, instrument or process line is placed on the computer aided design drawing, information relating to that piece of equipment, instrument or process line is entered into an attribute block, and is extracted or linked to a database file corresponding to the type of equipment, instrument or process line. Each piece of equipment, instrument or process line is provided in a separate record of the particular database file.

When the computer aided design drawing is completed, database output files are generated using the attribute extraction method according to the present invention. The graphical attribute information is appended into the corresponding equipment database file and, upon completion of the program, the output files directly reflect what is in the AutoCAD® graphics file. At this point, each database file may be translated in a standard database file (e.g., Lotus® file) which was previously set up by the method. These translated files may then be printed so that hard copies may be provided as reports relating to each of the pieces of equipment, instruments or process lines included within the computer aided design drawing. Alternatively, the reports may be provided in a format other than a hard copy such as on a display device.

The method and system according to the present invention allows a user to produce professional quality ISA STANDARD P&ID drawings quickly with very little knowledge of the standards and accepted instrument, control and engineering symbols. The attaching of attribute blocks to components in the CAD drawing according to the present invention via a menu allows a user to easily add process data, design data, purchasing data, maintenance data, environmental data, and OSHA data, for example, to all mechanical equipment, control and metering instruments, electrical equipment, piping and valves, safety and monitoring equipment, and insulated systems, for example. The method and system according to the present invention also allows a partial or total extraction of all desired data attached in the specific format with a limited user knowledge of a dBase®, Lotus® or similar spreadsheet software. The present invention also allows the review of CAD drawings such as P&ID's with respect to process, design, operating, maintenance, environmental, hazardous or OSHA considerations at any necessary time with minimal preparation time and a complete elimination of paper and file searches. The present invention additionally takes the "grunt work" out of producing P&ID's and adds a state of the art computer technology for the attachment, filing, storing and retrieval of vital data corresponding to particular components of the P&ID produced using a CAD system such as AutoCAD®.

BRIEF DESCRIPTION OF THE DRAWINGS

Other features and advantages of the present invention will become apparent in view of the following description taken in conjunction with the attached drawings, wherein:

FIG. 4, which includes FIG. 4A and FIG. 4B, illustrates a sample computer aided design system P&ID drawing to which an embodiment of the present invention may be implemented; and FIG. 5, which includes FIG. 5A and FIG. 5B, illustrates a sample data sheet corresponding to a component included in the P&ID drawing illustrated in FIG. 4 which may be provided according to an embodiment of the present invention.

DETAILED DESCRIPTION

Figure 1:
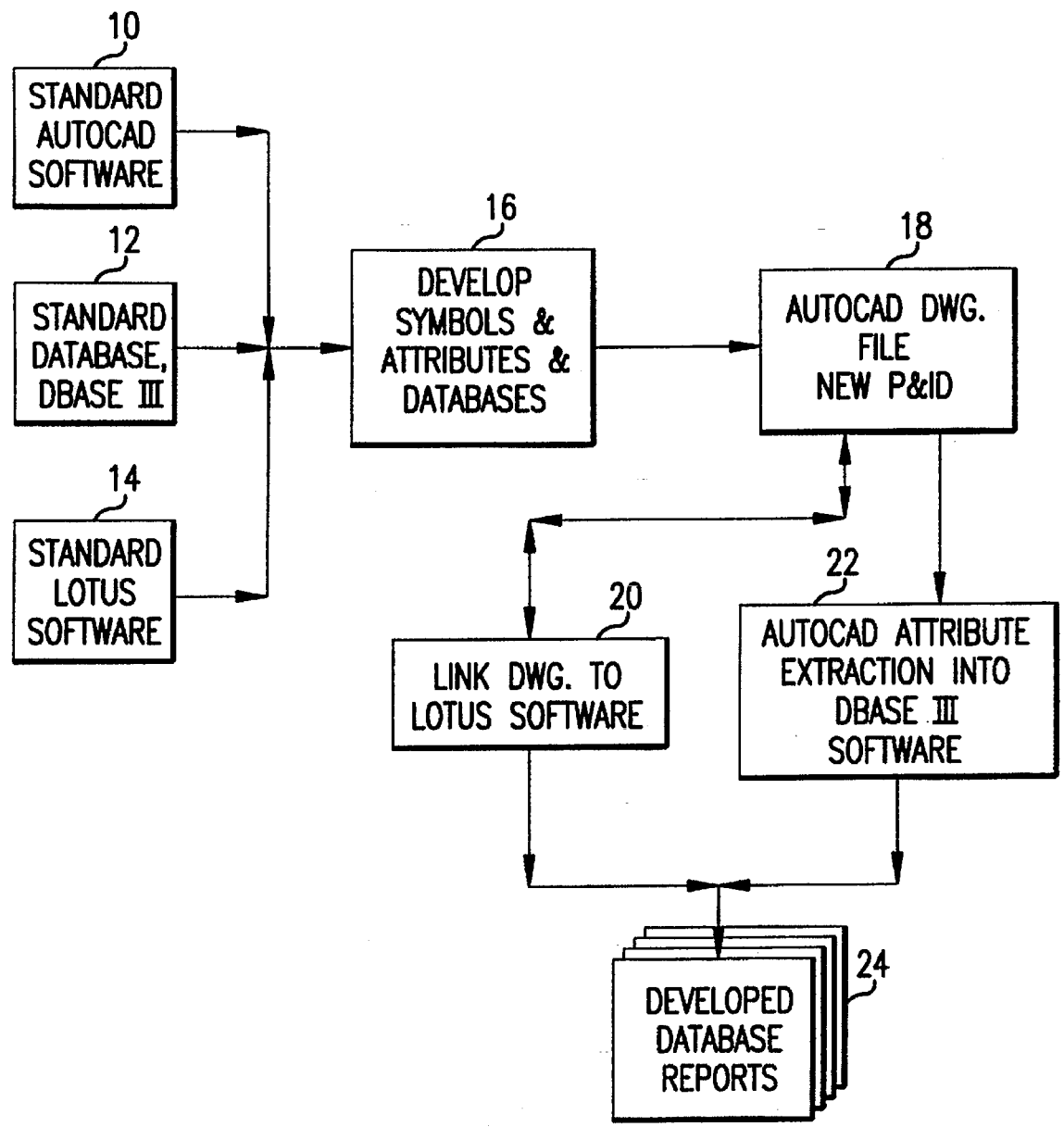
FIG. 1 illustrates a general flow chart describing an embodiment of the present invention.

FIG. 1 illustrates a general flow chart describing an embodiment of the present invention. The database extraction method and system according to an embodiment of the present invention illustrated in FIG. 1 involves graphic input using standard AutoCAD® software 10 along with the use of dBase® 3+ software 12 and standard Lotus® software 14. While certain versions of these software packages have been mentioned in this application, it is noted that any other versions of these software programs may be used in practicing the present invention.

Symbols, attributes and databases are developed in step 16 which correspond to each of a possible type of component to be included in the AutoCAD® P&ID drawing. The AutoCAD® drawing file is determined in step 18 according to the standard AutoCAD® software 10. In step 20 the AutoCAD® drawing file is linked to the standard Lotus® software 14. The dBase III® software 12 is used in step 22 to extract AutoCAD® attributes which directly correspond to each particular item or component in the AutoCAD® drawing. The standard Lotus® software 14 is combined with the dBase® III standard software 12 to provide developed database reports 24 indicating the extracted information relating to each component of the AutoCAD® drawing for review by a user. It is noted that step 20 may alternatively be inserted between steps 22 and 24 without any direct connection between the Lotus® software and the AutoCAD® drawing file.

Figure 2:
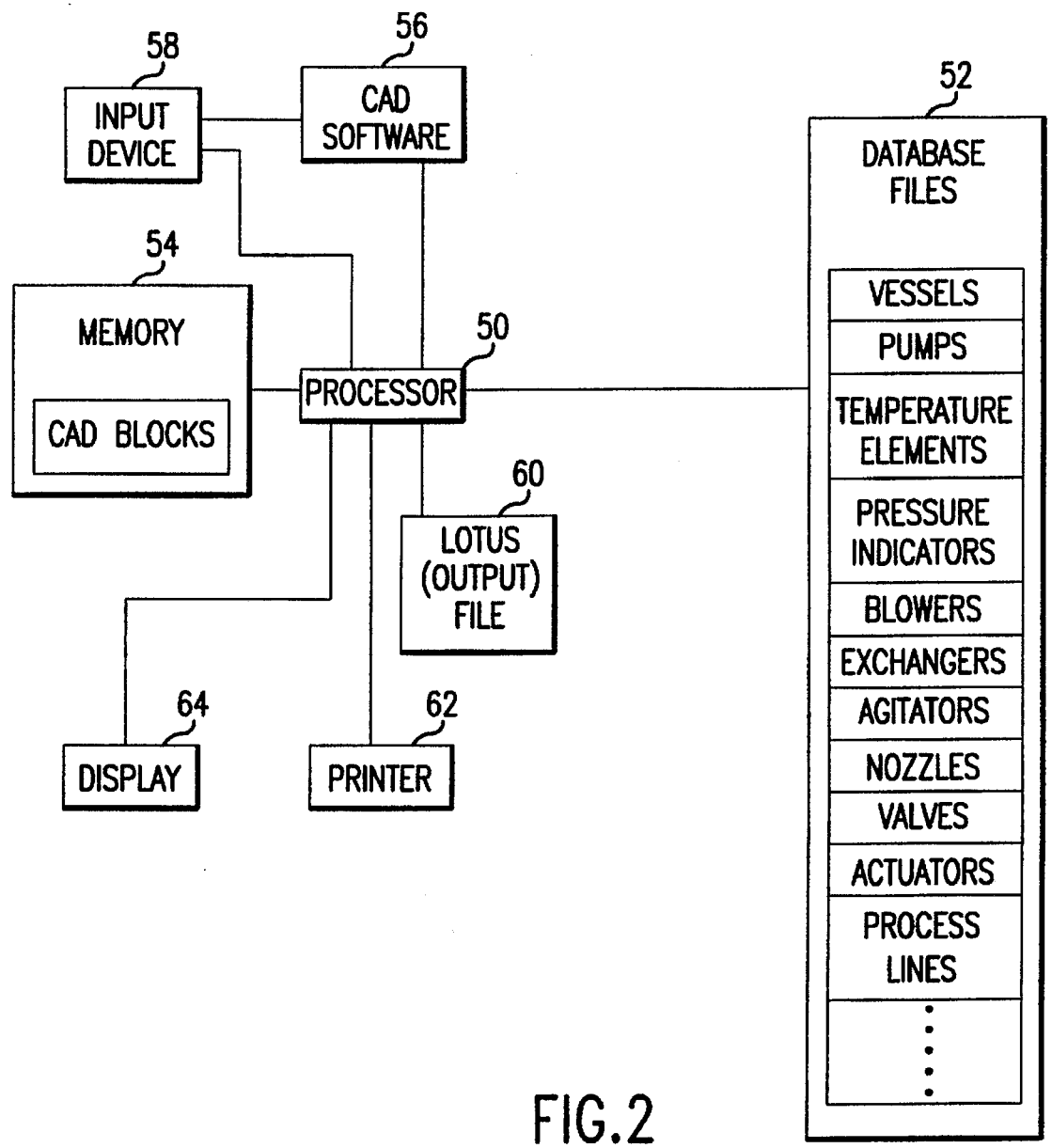
FIG. 2 illustrates a computer based system for implementing an embodiment of the present invention.

FIG. 2 illustrates a more detailed drawing of a system in which the method according to an embodiment of the present invention may be implemented. A processor 50 initially creates several standard databases in a standard dBase® format (e.g., a dBase® 3+ format). Processor 50 creates database files 52 which may include equipment and instruments such as vessels, pumps, temperature elements, pressure indicators, blowers, exchangers, agitators, nozzles, valves, actuators, process lines and/or any other major items which may typically be used in the creation of a computer aided design (CAD) drawing such as a Process & Instrumentation Drawing (P&ID).

For purposes of a specific embodiment of the present invention, a possible vessel database will be described in more detail in reference to the present invention in the following description. However, any other database information may be included in the vessel database files. Additionally, the present invention may easily be adapted for any other types of components to be included in a CAD system drawing by including particular attributes applicable to the components used by a particular user. Additionally, the attributes for a particular component may be changed based on a particular user's needs.

The processor 50 initially stores data in a memory 54 in standard Computer Aided Design blocks which have attributes attached thereto which directly correspond to each component which may be included in a CAD drawing to be implemented using CAD software 56. The CAD blocks included in memory 54 are initially entered through processor 50 using, for example, an input device 58 such as a keyboard or a mouse. Additionally, the CAD blocks included in memory 50 may be edited using user input device 58. For example, additional CAD blocks may be added or certain attributes of blocks already included in memory 54 may be edited. In any case, processor 50 generates database files 52 which are originally empty. When a component is placed on the CAD drawing being designed using CAD software 56, information (e.g., symbols and attributes) relating to that component is entered into memory 54. For example, when a vessel is placed on the drawing, information relating to that vessel is entered into a vessel attribute block included in memory 54. The information relating to the vessel could include, for example, a vessel number, volume, dimension and/or any other information relating to the vessel and included in the vessel database. Example attributes which may be used for a vessel component in the CAD blocks of memory 54 or the vessel database file included in database files 52 include but is not limited to the following:

VESSEL NUMBER:
DESCRIPTION #1:
DESCRIPTION #2:
DIAMETER×HEIGHT×LENGTH:
TANK DRAWING REFERENCE #:
DESIGN RATING:
DESIGN CODE:
NOMINAL VOLUME:
TYPE OF HEADS:
CONTAINED MATERIAL:
HORIZONTAL OR VERTICAL:
FLANGE CLASS:
FLANGE TYPE:
INSULATION TYPE:
INSULATION JACKET Y/N:
INTERIOR LINING:
TYPE OF INTERNAL F° CONTROL:
TYPE OF EXTERNAL F° CONTROL:
TYPE OF PRESSURE RELIEF SYSTEM:
TYPE OF VAPOR CONTROL:
OPERATING TEMPERATURE:
DESIGN TEMPERATURE:
OPERATING PRESSURE:
DESIGN PRESSURE:
P&ID REFERENCE DRAWING NUMBER:

The pump database may include items typical to a pump such as a pump number, capacity, horsepower, manufacturer, etc. In any case, since each vessel, pump, etc. is unique, each vessel, pump, etc. preferably requires a separate attribute block included in memory 54.

As indicated above, each of the database files 52 is originally empty. Information relating to each piece of equipment is then entered graphically in the CAD system using CAD software 56. The standard CAD blocks included in memory 54 include attributes attached to the blocks which directly correspond to each item in the particular equipment database. When a component is added in the CAD drawing, information relating to that component is entered into the respective CAD block included in memory 54. When the user has finished drawing the CAD drawing using input device 58 and CAD software 56, the database files 52 are generated using processor 50 by extracting the attributes included in the CAD blocks of memory 54 based on the drawing designed using the CAD software 56. In effect, the graphical attribute information is appended into the corresponding equipment database file. Therefore, the database files 52 include a reflection of what is included in the CAD software graphics file with additional attribute information relating to each of the components of the drawing. Processor 50 then translates each of the database files 52 into an output file 60 such as a Lotus® file. The output file 60 may then be printed using a printer 62 so that hard copy reports may be provided relating to each of the attributes of the components included in the CAD drawing. Alternatively, or in addition to the hard copy reports, the output files 60 may be provided to a user via another output format such as a display device 64. Further, any other method of providing the output data to a user may be implemented within the scope of the present invention, such as storing the data on a computer disk to be accessed by a user.

Figure 3:
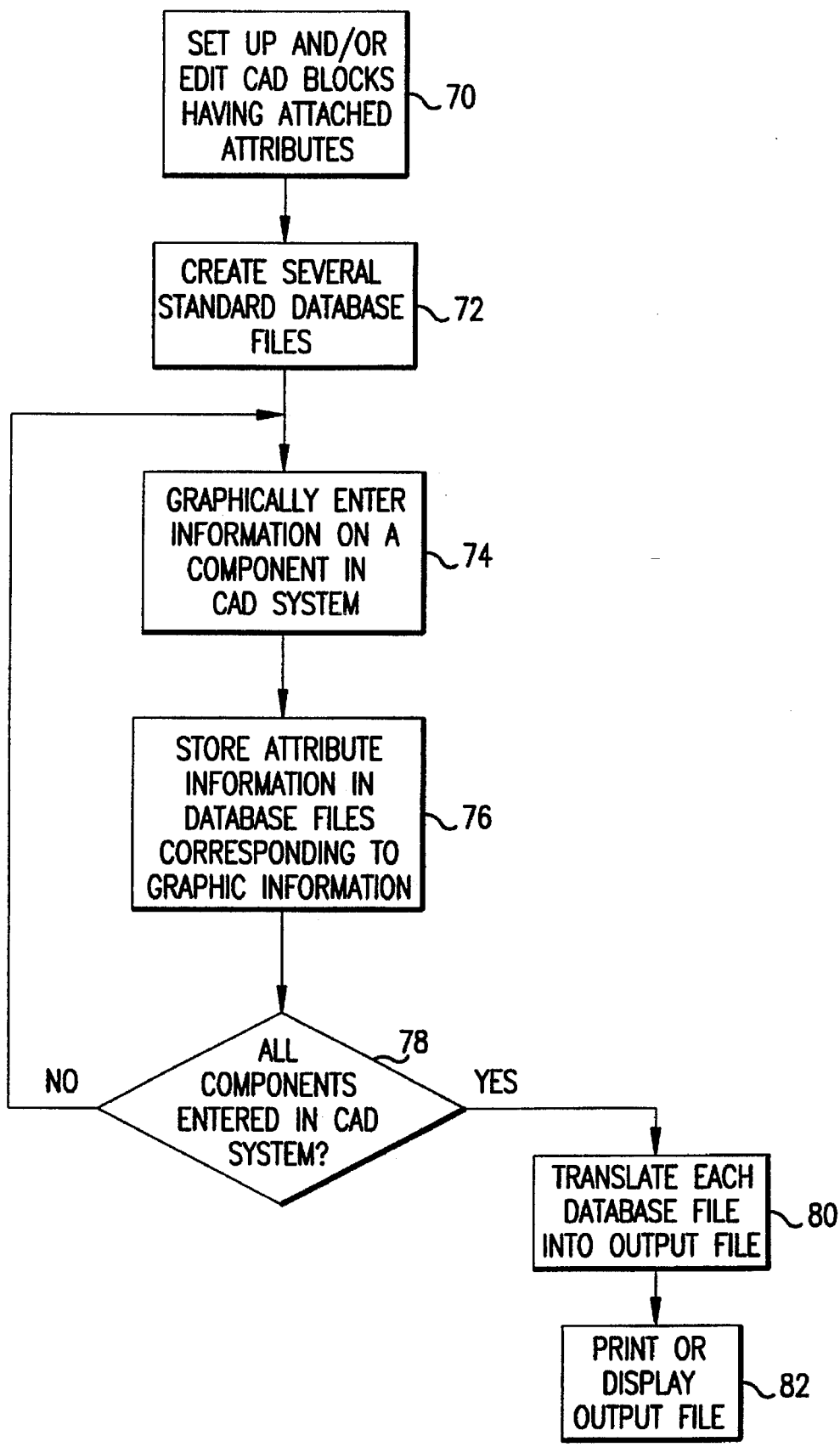
FIG. 3 illustrates a flow chart describing a method according to an embodiment of the present invention.

FIG. 3 illustrates a flow chart diagram describing the functions performed by processor 50 of FIG. 2 according to an embodiment of the present invention for an individual CAD drawing to be produced. The functions of FIG. 3 may be implemented, for example, using a computer software program run by processor 50 of FIG. 2. In step 70, the CAD blocks having attached attributes are set-up and/or edited. Specifically, CAD blocks are set up or edited in step 70 in memory 54 so that a separate block is included in the memory for each of the possible components to be used in the CAD drawing performed using the CAD software 56. Several standard database files 52 are created in step 72 of FIG. 3, such as vessel database files, pump database files, etc.

In step 74, information relating to a piece of equipment (or component) is graphically entered in the computer aided design system using input device 58 and CAD software 56. Step 76 stores the attribute information in the database files 52 which corresponds to the graphic information entered in the CAD system. Step 78 determines whether or not all information relating to the pieces of equipment or components has been entered into the CAD system for the particular drawing being produced. If step 78 determines that all information on pieces of components entered in the CAD system has not yet been entered for the drawing, steps 74, 76 and 78 are repeated until all components have been entered in the CAD system for that CAD drawing. Step 78 may be performed, for example, by an input from a user via the input device 58. Once it is determined in step 78 that all components have been added to the CAD drawing, each database file is translated in step 80 into an output file such as a Lotus® output file. The output file is then printed as a hard copy or displayed on a display device in step 82.

Figure 4B:
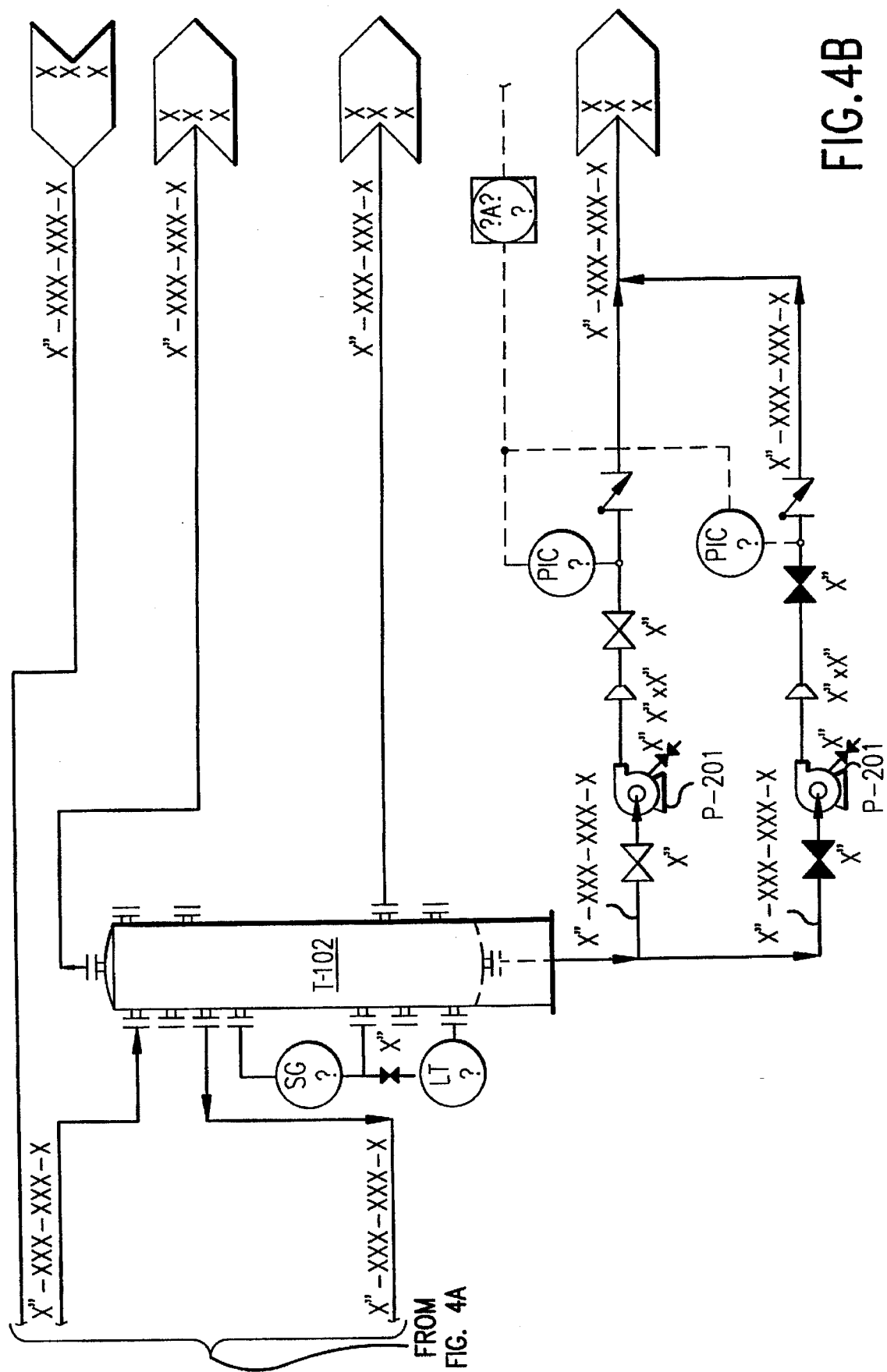

FIG. 4, which includes FIG. 4A and FIG. 4B, illustrates a sample P&ID drawing including a component labelled as "T-1001". The P&ID drawing of FIG. 4 additionally includes several other components (e.g., T-1002, etc.) and several process lines which have identifying labels (e.g., "XX-XXX-01-X" through "XX-XXX-13-X"). However, detailed attributes relating to the components or process lines are not indicated using typical CAD system drawings. As an example, component T-1001 may be a hydro carbon reactor having a variety of possible attributes. However, these attributes are not specifically illustrated on a P&ID drawing designed using typical CAD systems such as AutoCAD®.

FIG. 5, which includes FIG. 5A and FIG. 5B, illustrates a sample data sheet according to an embodiment of the present invention including attributes of vessel T-1001 illustrated in FIG. 4. The vessel description attribute is a "HYDRO CARBON REACTOR", the DIAMETER×HT attribute is 20"×10'-0", and the plant reference number for the vessel is "FP-1022". The design rating attribute is "300", the design code attribute is "ASME" and the nominal volume is "1500". The type of head attribute is "F&D" and the contained material attribute is "CRUDE". The flange class attribute is "150" and the flange type attribute is "S.D.". All of the attributes for the hydro carbon reactor vessel T-1001 are not illustrated in FIGS. 5A and 5B and the particular attributes illustrated in FIGS. 5A and 5B are for example purposes only. Additionally, a sample data sheet such as that illustrated in FIGS. 5A and 5B may be provided for each of the components illustrated in FIG. 4A and FIG. 4B in implementing an embodiment of the present invention.

The attributes of vessel T-1001 of FIG. 4 have been illustrated in the data sheet of FIGS. 5A and 5B as an example of a data sheet listing attributes of a sub-group of the components listed in the P&ID of FIG. 4. However, it is noted that the attributes of any particular sub-group of components included in a single P&ID drawing could be included on any particular data sheet provided by the system and method according to embodiments of the present invention, and attributes of all of the components of a single P&ID drawing could be included in a single data sheet report according to an embodiment of the present invention.

The present invention allows attribute data relating to components of a CAD system drawing to be automatically extracted and provided to a user in an easy and efficient manner. The CAD designed system and attribute extraction may be combined to provide a user with information not readily available to a user of a typical CAD drawing system. For example, if a first company has designed the system and a second company wishes to purchase the individual components of the system and build the system or wishes to determine how a particular system which has previously been installed in the plant of that company works, the present invention performs conjunction with the CAD software using database software so that a user may easily identify exactly what is contributing to the plant process. By appending the graphical attribute information into a corresponding database file and automatically providing the additional extracted attribute information to a user, the automated attachment, filing storing and retrieving of data vital to particular components of a CAD drawing is at a user's fingertips. In this manner, there is no need for guesswork or time consuming research by a user to determine attributes of components included in a CAD system drawing.

While specific embodiments of the present invention have been described as set forth above, it is apparent that the present invention should not be limited thereto and that alternative embodiments of the present invention may be implemented according to the intended spirit thereof and according to the broad scope of the appended claims. For example, while the present invention has been described above as being implemented in conjunction with AutoCAD® software, it is noted that the present invention may be practiced in conjunction with any similar computer aided design (CAD) system software. For example, the present invention may be practiced in conjunction with Intergraph® software, although Lotus® software is not normally used in conjunction with Intergraph® due to incompatibility problems Therefore, in the case of using the present invention in conjunction with Intergraph® software, it is preferred not to use the Lotus® software as described in practicing the present invention.

What is claimed is:

1. A computer implemented method of providing process database attribute information corresponding to components included in a computer aided design system drawing in a Process & Instrumentation Diagram format, comprising steps of:

storing data in a storage device corresponding to attributes of components which may be used in said computer aided design system drawing in said Process & Instrumentation Diagram format;

receiving graphically entered information relating to one or more components added to the computer aided design system drawing in said Process & Instrumentation Diagram format;

storing in a database file attribute information corresponding to the received graphically entered information in response to the stored data in the storage device; and outputting in a user readable format information corresponding to said attribute information stored in the database file.

2. The computer implemented method according to claim 1, wherein said components include pieces of equipment, instruments and process lines.

3. The computer implemented method according to claim 1, wherein said components include at least one of a group consisting of vessels, pumps, temperature elements, pressure indicators, blowers, exchangers, agitators, nozzles, valves, actuators and process lines.

4. The computer implemented method according to claim 1, wherein said user readable format is a hard copy output by a printer.

5. The computer implemented method according to claim 1, wherein said user readable format is the display of the information on a display device.

6. The computer implemented method according to claim 1, wherein said computer aided design system is an AutoCAD® system.

7. The computer implemented method according to claim 1, wherein said computer aided design system is an Intergraph® system.

8. A computer system providing process database attribute information corresponding to components included in a computer aided design system drawing in a Process & Instrumentation Diagram format, comprising:

a storage device storing blocks corresponding to attributes of components which may be used in said computer aided design system drawing in said Process & Instrumentation Diagram format;

an input device entering graphical information relating to one or more components to be added to the computer aided design system drawing in said Process & Instrumentation Diagram format;

a processor receiving said graphical information and storing in a database file attribute information corresponding to the received graphical information in response to the stored blocks; and an output device outputting in a user readable format information corresponding to said attribute information stored in the database file.

9. The computer system according to claim 8, wherein said processor stores the attribute information in a separate database file for each of a plurality of types of said components.

10. The computer system according to claim 8, wherein said output device is a printer.

11. The computer system according to claim 8, wherein said output device is a display monitor.

12. The computer system according to claim 8, wherein said output device is a write head writing said information on a memory device.

13. The computer system according to claim 8, wherein said components include pieces of equipment, instruments and process lines.

14. The computer system according to claim 8, wherein said components include at least one of a group consisting of vessels, pumps, temperature elements, pressure indicators, blowers, exchangers, agitators, nozzles, valves, actuators and process lines.

15. The computer system according to claim 8, wherein said computer aided design system is an AutoCAD® system.

16. The computer system according to claim 8, wherein said computer aided design system is an Intergraph® system.

17. The computer implemented method according to claim 1, wherein a user chooses a particular component included in the computer aided design system drawing in the Process & Instrumentation Diagram format and said step of outputting outputs in the user readable format all attribute information stored in the database file corresponding to the component chosen by the user.

18. The computer system according to claim 8, wherein a user chooses a particular component included in the computer aided design system drawing in the Process & Instrumentation Diagram format using said input device and wherein said output device outputs in the user readable format all attribute information stored in the database file corresponding to the component chosen by the user.

* * * * *